June 24, 1930.  T. J. FAY  1,766,617
VEHICLE
Filed Aug. 7, 1925   3 Sheets-Sheet 1

INVENTOR
THOMAS J. FAY
BY
Stockbridge & Borg
ATTORNEYS

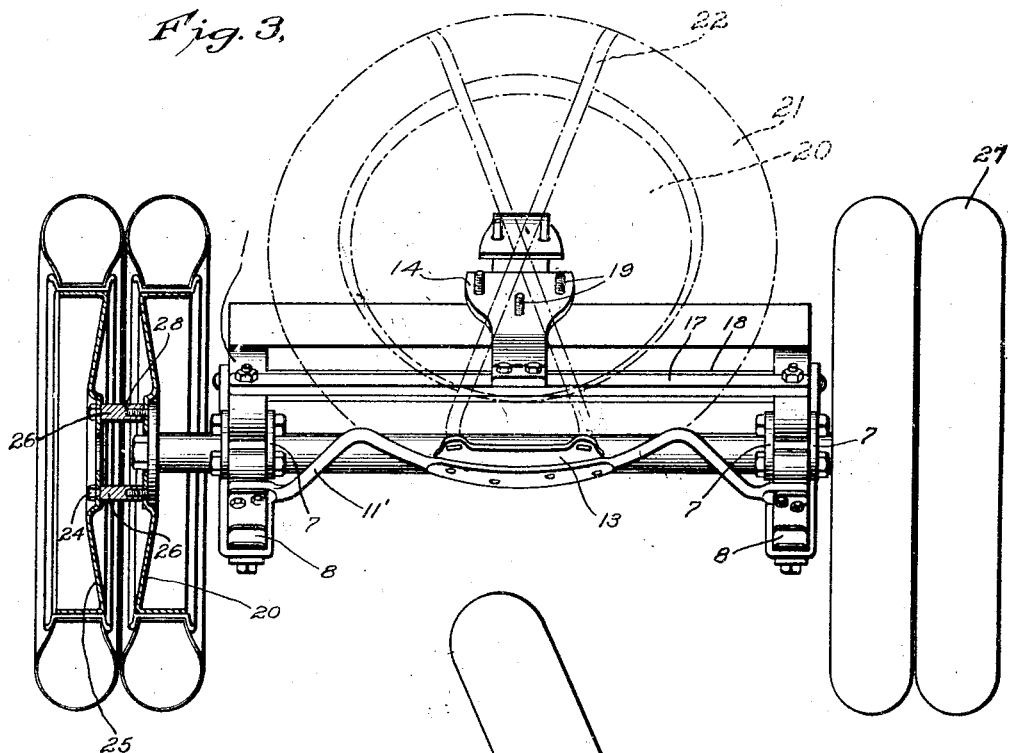
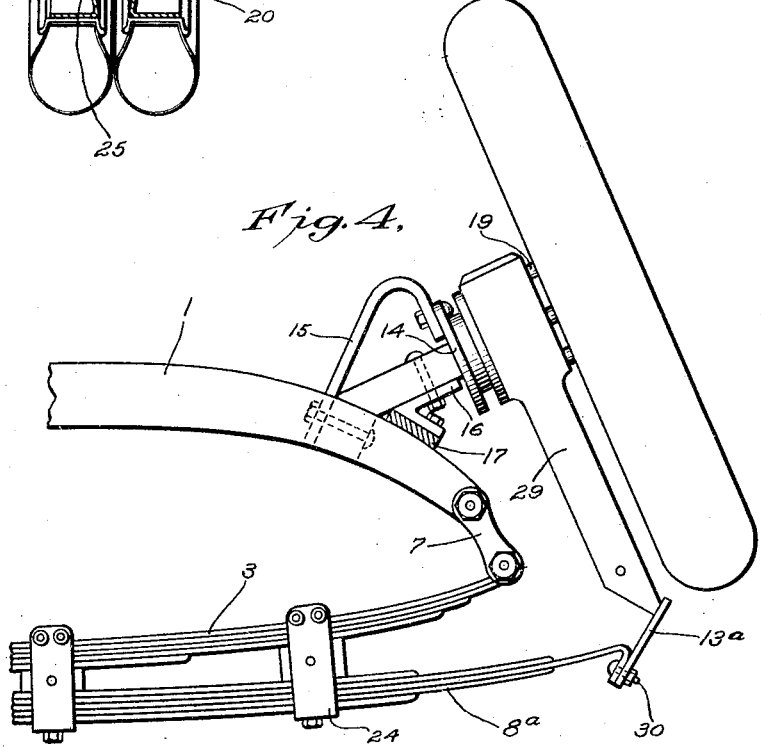

June 24, 1930.  T. J. FAY  1,766,617
VEHICLE
Filed Aug. 7, 1925  3 Sheets-Sheet 3

INVENTOR
THOMAS J. FAY
BY
Stockbridge & Borst
ATTORNEYS.

Patented June 24, 1930

1,766,617

UNITED STATES PATENT OFFICE

THOMAS J. FAY, OF BROOKLYN, NEW YORK

VEHICLE

Application filed August 7, 1925. Serial No. 48,703.

This invention relates to vehicles and has for an object to provide an improved construction in which the irregularities of a roadway over which the vehicle may travel, may be utilized to facilitate the travel of the vehicle; with which the relative movements of the chassis frame and axle will be controlled in an exceptionally simple and effective manner without impairing the riding qualities of the vehicle; with which increased traction on the driving wheels may be obtained in a simple manner whenever desired; and which will provide a novel support for a bumper.

A further object is to provide an improved construction for accomplishing each and all of the above objects which will be relatively simple, efficient, effective and inexpensive.

Various other objects and advantages will be apparent from the following description of several embodiments of the invention, and the novel features will be particularly pointed out hereinafter in connection with the appended claims.

In the accompanying drawings:—

Fig. 3 is a rear end elevation of the same with the spare wheel utilized to increase the traction of the road wheels;

Fig. 4 is an end elevation of a portion of a vehicle constructed in accordance with the invention and illustrating another embodiment of the invention;

Figure 1:
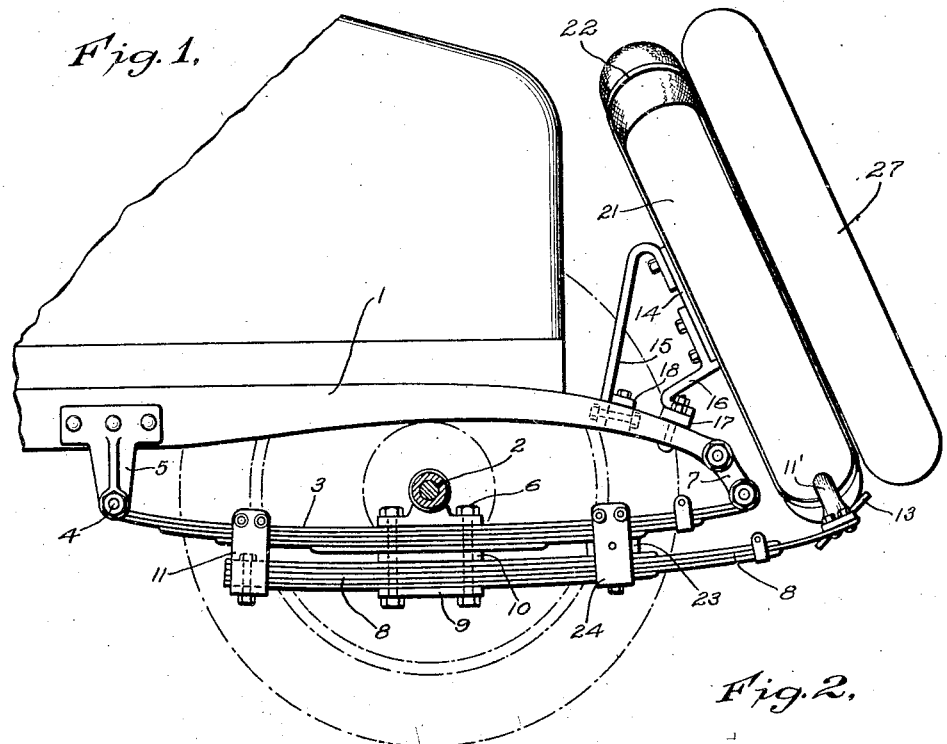
Fig. 1 is a side elevation partly in section of the rear end of the vehicle constructed in accordance with the invention and illustrating one embodiment thereof.
Figure 2:
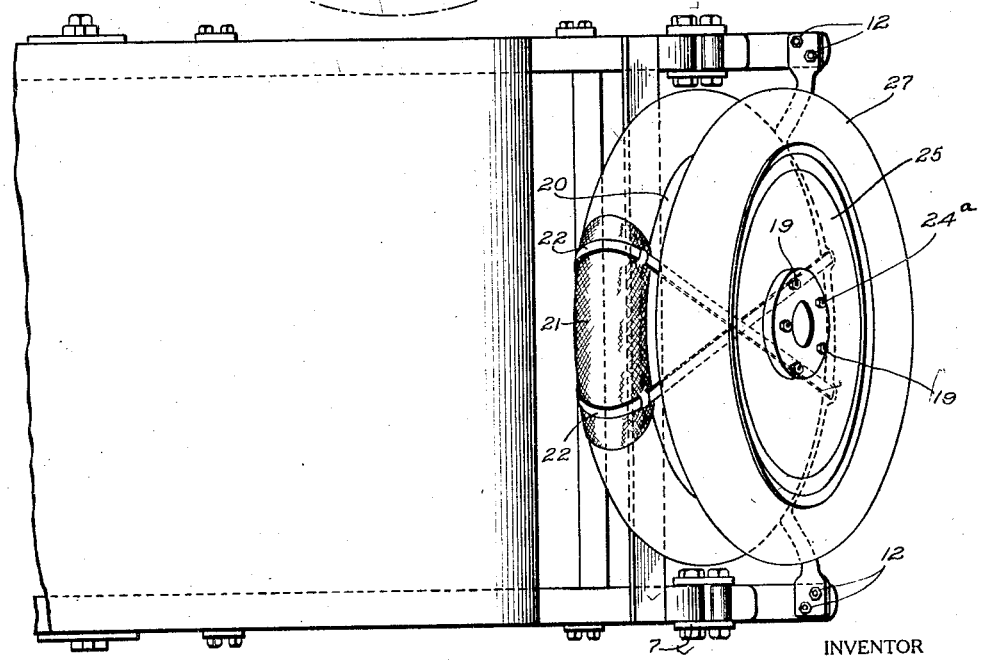
Fig. 2 is a plan of the same.

In the embodiment of the invention illustrated in Figs. 1 to 3, the chassis frame 1 is connected to the rear axle 2 by any suitable spring suspension means, such as a laminated leaf spring 3 which is connected at one end by a pin 4 to a bracket 5 of the chassis frame, at an intermediate point by clamping bolts 6 and the customary saddle on the axle for partial rotation thereon, and at its other end by a shackle device 7 to an end of the chassis frame. Resilient devices, such as laminated leaf spring arms 8, are secured to the axle part by suitable means such as the bolts 6 and plates 9 and 10 which assist in clamping the leaf springs 3 to the axle, a short projecting end of each spring arm 8 being clamped, such as by a clamping device 11, to an intermediate point of a spring 3 at one side of its connection to the axle. Each arm 8 extends rearwardly, in the particular illustrated embodiment, immediately below the rear extension of the adjacent spring 3, but extends to a slightly greater distance and with the spring laminations decreasing progressively upon both upper and lower surfaces as shown in Fig. 1.

As usual in vehicle constructions a leaf spring 3 is provided at each side of the chassis frame and accordingly a spring arm 8 is also preferably provided at each side beneath the spring 3. A cross bar 11' is secured by suitable means, such as bolts 12, to the free projecting ends of the arms 8 so as to extend crosswise of the vehicle at the rear, and intermediate of its ends the cross bar is provided with an abutment plate 13 which has an inclination in a direction lengthwise of the vehicle, the inclination being preferably about 45°.

A spare wheel carrier or base 14 is mounted upon the chassis frame in any suitable manner such as by brackets 15 and 16 which connect the carrier with suitable cross bars 17 and 18 that extend transversely of the vehicle across the rearwardly extending arms of the chassis frame as shown in Fig. 1. The base or carrier 1 may be provided with a plurality of threaded studs 19 (Figs. 2 and 3) upon which a spare wheel 20 (Fig. 2) may be confined by suitable nuts (not shown). The spare wheel 20 may be provided with a spare pneumatic tire 21 as usual, and when the tire is inflated, it will be disposed in proximity to or in contact with the inclined abutment surface of the plate 13. Preferably that tire will be in contact with the plate 13 so that about one fourth of the load at the rear end will be taken up by the plate 13 and the spare tire and wheel. It is also preferable in many instances to extend straps 22 from the plate 13 over the upper part of the tire 21, such as shown in the drawings, in order to control the separating movements of the chassis frame and axle.

A block 23, preferably of resilient material such as resilient rubber, is interposed between the free projecting end of each arm 8 (Fig. 1) and carried by a clamping frame 24 which is adjustable along the arm 8 and spring 3 to a limited extent, so that by positioning the block 23 at different points along the arm 8 the effective length of the free resilient portion of the same may be varied. Through such variation, the resistance of the arms 8 to the relative approach of the chassis frame and axle may be varied. The base or carrier 14 for the spare wheel 20 is preferably disposed upon the chassis frame at an angle to the vertical and in such relation to the abutment plate 13 of the cross bar 11, that the pressure of the tire 21 upon the plate 13 will tend to force the chassis frame forwardly relatively to the axle.

When the vehicle is travelling over a roadway and the wheels drop into a depression, the body will tend to follow, and the following resulting increase of pressure of the spare tire upon the inclined plate will tend to push the body forwardly and pull the axle part rearwardly. There is sufficient flexibility in either the spring 3 or the arm 8 to permit of a slight movement lengthwise of the vehicle between the chassis frame and axle, and as a result, the downward pressure of the body will be converted into horizontally acting forces which will force the body forwardly and retard the wheels in the depression, particularly as the wheel starts to rise out of the depression. This slight retardation of the wheel relatively to the body enables the wheel to climb out of the depression more readily and with less resistance from the depression walls. A similar effect occurs when the wheels strike a ridge in the roadway.

By the conversion of the downward pressure of the vehicle body into a forward push in this manner, little energy is lost by reason of the retarding effect of the depression upon the wheel. At the same time the movements of the body and axle toward one another will be resiliently resisted and stabilized by the resiliency of the pneumatic tire and the flexure of the springs 3 and 8. Therefore the body will be stabilized and the riding qualities of the vehicle very materially improved. With this construction, a greater mileage for a given consumption of fuel is possible, and this has been proven by repeated careful tests of a vehicle when operated both with and without this improved construction over the same roadway. The movement of the body away from the axle will be checked by the straps 22 which extend over the tire from the plate 13, and therefore the resiliency of the tire together with the resiliency of the spring arms 8 and the springs 3 will be utilized to also resist separation of the axle and body in a vertical direction.

The spare wheel 20 is normally confined upon the studs 19 by suitable nuts 24ª (see Figs. 2 and 3). Preferably two spare wheels are employed and when so employed, the second spare wheel 25 (Figs. 2 and 3) will be secured to the first spare wheel 20 by removing the nuts from the studs 19, threading extension rods 26 upon the studs 19 as nuts to confine the wheel 20 thereon. The rods 26 have reduced threaded shouldered free ends upon which ends the second wheel 25 may be mounted and confined thereon by nuts 24ª which have been removed from the studs 19. A spare tire 27 may be mounted upon the spare wheel 25 as usual.

When increased traction of the road wheels is desired, either one or both of the spare wheels may be removed from the base 14 and secured to one or both of the road wheels as shown in Fig. 3. To secure one of the spare wheels to the road wheel, the usual nuts, similar to 24ª, which are provided upon the usual wheel hub studs 28, are removed, the rods 26 applied thereto to confine the road wheel to its hub, and the spare wheel secured upon the free ends of the rods 26 by the nuts 24ª. Extra rods 26 may be carried for use when one desires to connect both spares to the road wheels. Increased tire surface will then be provided for the road driving wheels, and with the increased traction thus provided the vehicle may be propelled through a soft roadway. The increased traction surface thus provided will also be of effective assistance in preventing skidding. It will therefore be obvious that the spare wheels may selectively be utilized to stabilize the movements of the body of the vehicle and lessen the resistance of road undulations, as well as to be available for use interchangeably with the road wheels when punctures occur, or in conjunction with the road wheels to increase the traction upon the roadway.

It will be therefore noted that a proportion of the load of the body of the vehicle or chassis frame may be taken up by the arms 8 and cross plate, and since the whole load is then divided between the plate 13 and the usual springs 3, this will provide in effect a three point suspension between the axle and body at each end or ends constructed in accordance with the invention.

In Fig. 4 a somewhat similar construction is illustrated, the principal difference from the embodiment shown in Figs. 1 and 3 being in the substitution of a relatively rigid post 29 for one of the spare wheels, the post 29 being angularly disposed in such a manner as to bear upon an inclined plate 13$^a$ corresponding to the plate 13 of Figs. 1 to 3. The plate 13$^a$, however, in this instance, is directly secured, such as by bolts 30 to the free ends of the arms 8$^a$ corresponding to the arms 8 of Figs. 1 to 3. This embodiment of the invention operates similarly to that of the embodiment shown in Figs. 1 to 3, except that the resiliency of the spare tire is not available for stabilizing the relative movements of the body and axle, this function being now taken by the arms 8$^a$ and springs 3. The separation of the body and frame, of course, will not be restrained by the post 29.

Figure 5:
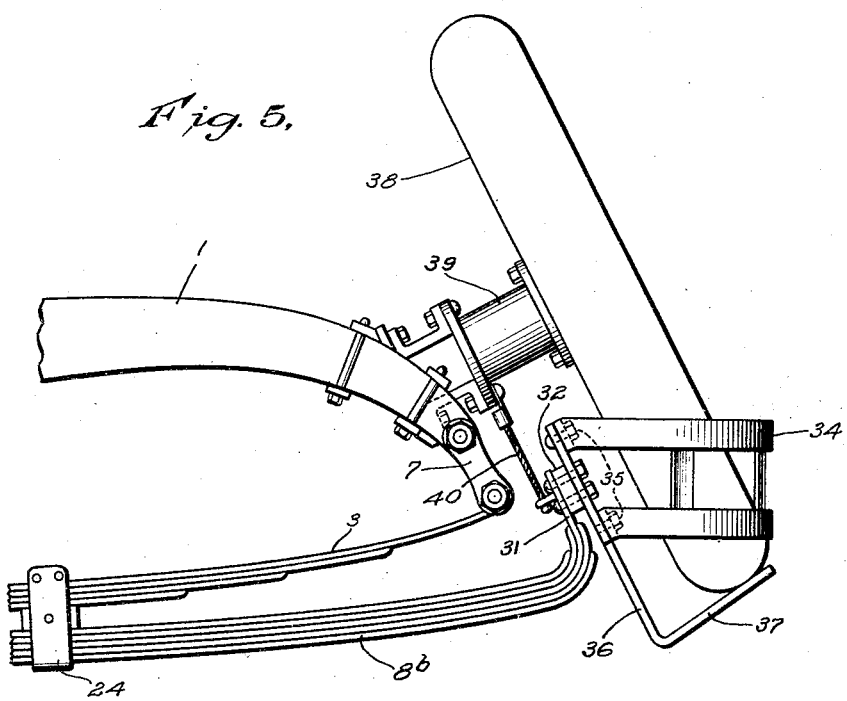
Fig. 5 is an end elevation of a vehicle constructed in accordance with the invention and illustrating still another embodiment thereof.
Figure 6:
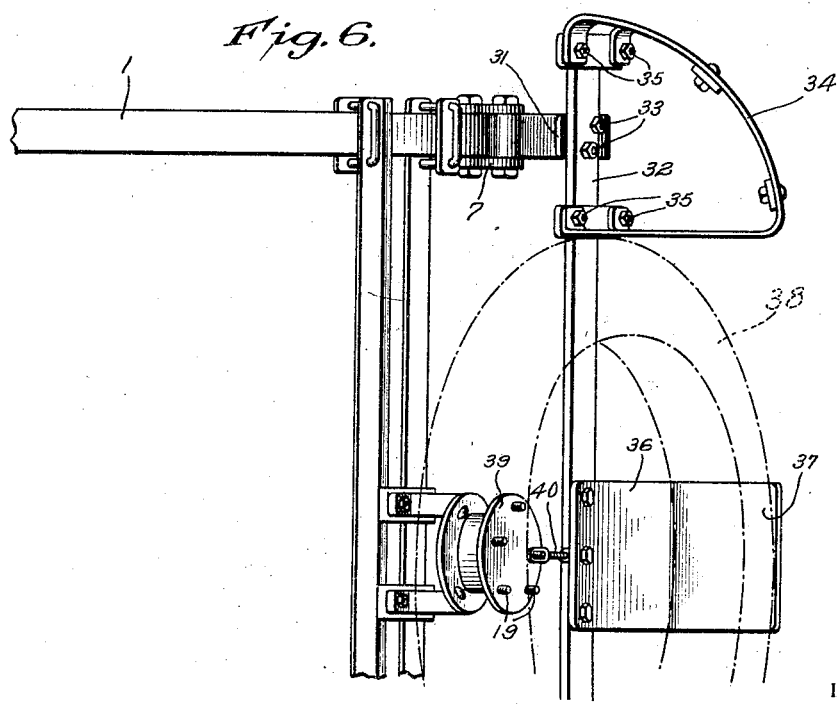
Fig. 6 is a plan of the same but with the spare wheel removed to better illustrate certain details.

In Figs. 5 and 6 another form of the invention is illustrated in which the leaves forming part of the spring bars 8$^b$, corresponding to the arms 8 of Figs. 1 and 3, extend for nearly the whole length of the free end, and one or more of the central leaves of each arm is turned upwardly at 31 to provide supports 31. The two supports 31 are connected by a bar 32 which is secured thereto in any suitable manner, such as by bolts 33, so as to extend transversely across the vehicle and connect the two arms 8$^b$ as shown in Fig. 6.

The bar 32 at its ends also extends outwardly beyond each arm 8$^b$ for a short distance. Upon these outwardly projecting ends and at intermediate points small side or wing bumpers 34 may be secured, such as by bolts 35, the side bumpers extending rearwardly in such a manner as to protect the rear fenders as usual. To the cross bar 32 an L-shaped foot plate 36 is secured, so as to depend therefrom with its free arm 37 extending upwardly and rearwardly in an inclined direction. A spare wheel and tire 38 are removably mounted in a suitable manner, such as described for Figs. 1 to 3, upon a base 39 with the tire resting or bearing against the inclined arm 37, the latter functioning the same as the plate 13 of Figs. 1 to 3.

Instead of the straps 22 employed in Figs. 1 to 3, a flexible member 40 may be connected between the base 39 or the chassis frame and the cross bar 32, and for such purpose I have found a flexible wire rope or cable to be very satisfactory. This rope or cable is connected between the body or chassis frame and the arms 8$^b$ in such a manner as to check relative separation of the body and axle beyond a predetermined extent, such checking being resiliently accomplished by reason of the resiliency in the arms 8$^b$.

In the operation of a vehicle constructed in accordance with the invention, a portion of the load will usually be taken up by the springs 8$^a$ or 8$^b$ and the spare tire or post with which they cooperate through the plate 13 or footplate 36. When the wheels drop into a depression in the roadway, the relative separation of the body and axle will be resisted by the straps 22 and the tire (Figs. 1 to 3), or by the rope 40 (Fig. 5). When the wheels start to rise out of the depression or when the wheels strike an elevation in the roadway, there will be a relative approach of the axle and body, with a resulting increase of pressure between the spare tire 21 and the plate 13, or the spare tire 38 and the rest 37 in Fig. 5, or between the post 29 and the plate 13$^a$ in Fig. 4, and by reason of the inclination of the plates 13 or 13$^a$, or of the arm 37, the pressure will be exerted forwardly upon the body and rearwardly upon the axle. The downward pressure will therefore give the body a forward impulse and the wheels or axle will be pulled rearwardly to an extent permitted by the suspension means, which action I have found materially assists in the removal of the wheel from the depression, or in its surmounting of an elevation in the roadway, after which the wheel will move forwardly with the body.

Thus there is little propulsion energy lost by reason of the resistance of the depressions or elevations in the roadway. By actual tests with a vehicle equipped alternately with this device and with the ordinary suspension device, it has been found that with this device a considerably greater mileage per unit of fuel consumption is obtained. At the same time, the vertical movements of the body will be resiliently or yieldingly opposed and stabilized.

When increased traction in the road wheels is desired, either one or both spare wheels may be attached to the regular road wheels to provide increased road contact, and therefore an increase in the traction upon the roadway. The stablizing mechanism also serves as a convenient, novel, and practical support for the side or wing bumpers.

The plate 13 is preferably arcuate with the radius of curvature of the arcuate part at least as large as and preferably exceeding slightly the outside radius of the inflated tire so that it will coact with the tire in resiliently resisting side swaying of the body part.

It will be obvious that various changes in the details, which have been herein described and illustrated for the purpose of explaining the nature of the invention, may be made by those skilled in the art within the principle and scope of the invention as expressed in the appended claims.

I claim:—

1. In a vehicle construction having a chassis frame part, an axle part, and a spring suspension device between said parts pivotally connected to said axle part, a resilient arm secured at one end to said device and having a projecting free portion thereof, additional means interposed between the chassis frame part and the free portion of said arm, whereby the latter will resiliently oppose any relative movement of said part and means for varying the effective length of the free portion of said arm to vary the resilient opposition to relative movement of said parts.

2. In a vehicle construction having a chassis frame part and an axle part, a spring element connected at its ends to the chassis frame part and pivotally connected at an intermediate point to said axle, a member secured at one end to said element and axle part and having a free, flexible, resilient, projecting portion, a device also coupling the free projecting portion of said member to said element and adjustable along the latter to different points in order to vary the effective length of the projecting free portion of the member, and means interposed between the chassis frame part and the free projecting part of said member for controlling any relative movement between said parts through said member.

3. In a vehicle construction having a chassis frame part, an axle part, and a resilient suspension between said parts, a member secured to one of said parts and having a free, flexible, resilient, projecting portion with an abutment surface inclined lengthwise of the vehicle, and an element carried by the other of said parts and coacting with said inclined abutment surface upon relative movement between said parts, whereby upon relative movement of said parts the pressure between said element and abutment surface will be opposed by forces acting in directions lengthwise of the vehicle.

4. In a vehicle construction having a chassis frame part, an axle part, and a resilient suspension between said parts, a member secured to one of said parts and having a free, flexible, resilient, projecting portion with an abutment surface inclined to the vertical, and an element carried by the other of said parts and coacting with said inclined abutment surface upon relative movement between said parts, whereby upon relative movement of said parts the pressure between said abutment surface will be opposed by component forces transverse to the vertical.

5. In a vehicle construction having a chassis frame part, an axle part, and a resilient suspension device between said parts at opposite sides of the vehicle, spring arms anchored at one end for movement with said axle part and projecting therefrom, a cross member connecting the free ends of said arms, and means including a spare pneumatic tire carried by the chassis frame part and normally contacting with said cross member for resiliently controlling relative movement of said parts.

6. In a vehicle construction, having a chassis frame part, an axle part, and a resilient suspension device between said parts at opposite sides of the vehicle, and pivotally connected to said axle part, spring arms anchored at one end for movement with said axle part and projecting therefrom, a cross member connecting the free ends of said arms, means including a spare pneumatic tire carried by the chassis frame part and cooperating with said cross member for resiliently controlling relative movement of said parts, and means for adjustably clamping the free projecting portions of said arms to the suspension device to vary the effective lengths of the projecting portions of said arms.

7. In a vehicle construction having a chassis frame part, an axle part, and a resilient suspension device between said parts at opposite sides of the vehicle, spring arms anchored at one end for movement with said axle part and projecting therefrom, a cross member connecting the free ends of said arms, and means including a spare pneumatic tire carried by the chassis frame part and cooperating with said cross member for resiliently controlling relative movement of said parts, the portion of the cross member with which the tire engages being inclined in a direction lengthwise of the vehicle, whereby the pressure of the tire upon said cross member will be resolved into a component acting lengthwise of the vehicle and tending to produce relative opposite movement of said parts in a direction lengthwise of the vehicle.

8. In a vehicle construction having a chassis frame part, an axle part, and a suspension device between said parts at opposite sides of the vehicle, a resilient flexible element anchored at one end for movement with one of said parts and having a free flexible projecting portion, and a pneumatic device carried by the other of said parts and normally engaging with the free, flexible, projecting portion of said element, whereby relative movement of said parts will be prevented by the resiliency of said pneumatic device and element, in addition to said suspension device.

9. In a vehicle construction having a chassis frame part, an axle part, and a spring suspension device between said parts at opposite sides of the vehicle, spring arms anchored at one end for movement with said axle part and having their other ends free and projecting, a cross member connecting the free ends of said arms, and means carried by the chassis frame part and normally engaging said cross member, whereby said arms and means will have a supplemental control upon the relative movements of said parts.

10. In a vehicle construction having a chassis frame part, an axle part, and a spring suspension device between said parts at opposite sides of the vehicle, spring arms anchored at one end for movement with said axle part and having their other ends free and projecting, a cross member connecting the free ends of said arms, means carried by the chassis frame part and normally engaging said cross member, whereby said arms and means will have a supplemental control upon the relative movements of said parts, and means for limiting the relative separation of said parts.

11. In a vehicle construction, having a chassis frame part, an axle part, and a spring suspension device between said parts at opposite sides of the vehicle, spring arms anchored at one end for movement with said axle part and having their other ends free and projecting, a cross member connecting the free ends of said arms, an element carried by the chassis frame part and normally bearing upon said cross member, whereby said element and arms will resiliently oppose relative approach of said parts, means for adjustably clamping the free projecting portions of said arms to the suspension device to vary the effective lengths of the free projecting portions of said arms, and flexible means for limiting separation of said parts.

12. In a vehicle construction, having a chassis frame part, an axle part, and an additional element anchored for relative movement with one of said parts and having a projecting inclined portion, an inflated spare tire, means for mounting said spare tire on the other of said parts for engagement with the projecting portion of said element whereby relative movement of said parts will be controlled by the spare tire.

13. In a vehicle construction having a chassis frame part, an axle part, and a spring suspension device between said parts at each side of the vehicle, a cross member carried by said suspension devices at a distance from the axle part, an inflated pneumatic tire, means for mounting said pneumatic tire on the other of said parts for normal engagement with the cross member, whereby relative movement of said parts will be controlled at least in part by said spare tire.

14. In a vehicle construction having a chassis frame part, an axle part, and a spring suspension device between said parts at each side of the vehicle, a cross member carried by said suspension devices at a distance from the axle part, an inflated pneumatic tire, means for mounting said pneumatic tire on the other of said parts for engagement with the cross member, whereby relative movement of said parts will be controlled at least in part by said spare tire, the portion of said cross member engaged by said tire being inclined in a direction lengthwise of the vehicle.

15. In a vehicle construction having a chassis frame part and an axle part, and suspension means connecting the same, and additional means interposed between said parts and assuming a portion of the load of said chassis frame part and through such load urging said parts in opposite directions lengthwise of the vehicle, whereby the resistance caused by the road wheel striking obstructions will be effectively lessened.

16. In a vehicle construction having a chassis frame part and an axle part, and suspension means connecting the same, and additional means interposed between said parts and assuming a portion of the load of said chassis frame part and through such load urging said parts in opposite directions lengthwise of the vehicle, whereby the resistance caused by the road wheel striking obstructions will be effectively lessened, said means including an inclined plate carried by one of said parts and a member contacting therewith and carried by the other of said parts, the inclination of said plate being in a direction lengthwise of the vehicle.

17. In a vehicle construction having a chassis frame part and an axle part, and suspension means connecting the same, and additional means interposed between said parts and assuming a portion of the load of said chassis frame part and through such load urging said parts in opposite directions lengthwise of the vehicle, whereby the resistance caused by the road wheel striking obstructions will be effectively lessened, said means including an inclined plate carried by one of said parts and a pneumatic tire carried by the other of said parts and contracting with said inclined plate.

In witness whereof, I hereunto subscribe my signature.

THOMAS J. FAY.